(12) United States Patent
Feind et al.

(10) Patent No.: US 6,378,604 B1
(45) Date of Patent: Apr. 30, 2002

(54) TO HEAT EXCHANGER

(76) Inventors: Jon Charles Feind, EMC Engineers, 1155 Westmoreland, Suite 119, El Paso, TX (US) 79925; Juan Manuel Villalobos, Barnhart-Taylor, Inc., 1602-A E. Yandell Dr., El Paso, TX (US) 79912

( * ) Notice: Subject to any disclaimer, the term of this patent is extended or adjusted under 35 U.S.C. 154(b) by 0 days.

(21) Appl. No.: 09/340,843

(22) Filed: Jun. 28, 1999

(51) Int. Cl.[7] .................................................. F28F 3/00
(52) U.S. Cl. ....................................... 165/166; 165/165
(58) Field of Search .......................... 165/166, 67, 165, 165/DIG. 372, DIG. 382, DIG. 387, DIG. 392

(56) References Cited

U.S. PATENT DOCUMENTS

| | | | | |
|---|---|---|---|---|
| 1,833,166 A | * | 11/1931 | Lucke | 165/166 |
| 3,757,856 A | * | 9/1973 | Kun | 165/166 |
| 3,758,996 A | * | 9/1973 | Bowser | 55/385.1 |
| 3,912,004 A | * | 10/1975 | Darm | 165/166 |
| 3,986,549 A | * | 10/1976 | Huggins et al. | 165/82 |
| 4,043,388 A | * | 8/1977 | Zebuhr | 165/166 |
| 4,116,271 A | * | 9/1978 | De Lepeleire | 165/166 |
| 4,183,402 A | * | 1/1980 | Cotter | 165/166 |
| 4,193,236 A | * | 3/1980 | Mazzoni et al. | 52/172 |
| 4,384,611 A | * | 5/1983 | Fung | 165/166 |
| 4,569,391 A | * | 2/1986 | Hulswitt et al. | 165/166 |
| 4,758,385 A | | 7/1988 | Acker et al. | |
| 4,846,266 A | | 7/1989 | Acker et al. | |
| 4,907,648 A | | 3/1990 | Emmerich et al. | |
| 5,303,771 A | * | 4/1994 | Des Champs | 165/166 |
| 5,322,117 A | | 6/1994 | Guetersloh et al. | |
| 5,487,424 A | | 1/1996 | Davison | |
| 5,927,395 A | * | 7/1999 | Damiani | 165/166 |

FOREIGN PATENT DOCUMENTS

| | | | | |
|---|---|---|---|---|
| FR | 043226 | * | 2/1982 | 165/166 |
| JP | 0021792 | * | 2/1982 | 165/166 |

* cited by examiner

*Primary Examiner*—Ira S. Lazarus
*Assistant Examiner*—Tho Duong
(74) *Attorney, Agent, or Firm*—Henry L. Smith, Jr.

(57) ABSTRACT

A structure of, and process for making, an improved heat exchanger. The exchanger may be used for heat transfer between air going to a space for human comfort, and humid, cooled air from an evaporative cooling system. The heat exchanger is made from a series of layers of thermoplastic sheeting spaced apart in a stack by uniquely shaped flat-topped dimples formed therein. The plates are joined together at their edges by adhesive and sealants and aerodynamically designed U-shaped clips. The clips are installed in a manner to form alternating channels of cooled and non-cooled air streams flowing perpendicularly to each other in the stack of plates. Special alignment detentes provide easier stacking and assembly of the plates.

2 Claims, 22 Drawing Sheets

ELEMENTS:
A - DIMPLE SPACING = 1 INCH (2.540CM)
B - DIMPLE BASE DIAMETER = 0.25 INCHES (0.635CM)
C - DIMPLE HEIGHT = 0.25 INCHES (0.635CM)
D - DIMPLE CIRCULAR FLAT TOP DIAMETER = 0.1618 INCHES (0.411CM)
E - DIMPLE TRANSITION VERTICAL TO FLAT TOP RADIUS = 0.3125 INCHES (0.0794CM)
F - DIMPLE TRANSITION VERTICAL TO FLAT BASE RADIUS = 0.125 INCHES (0.3175CM)

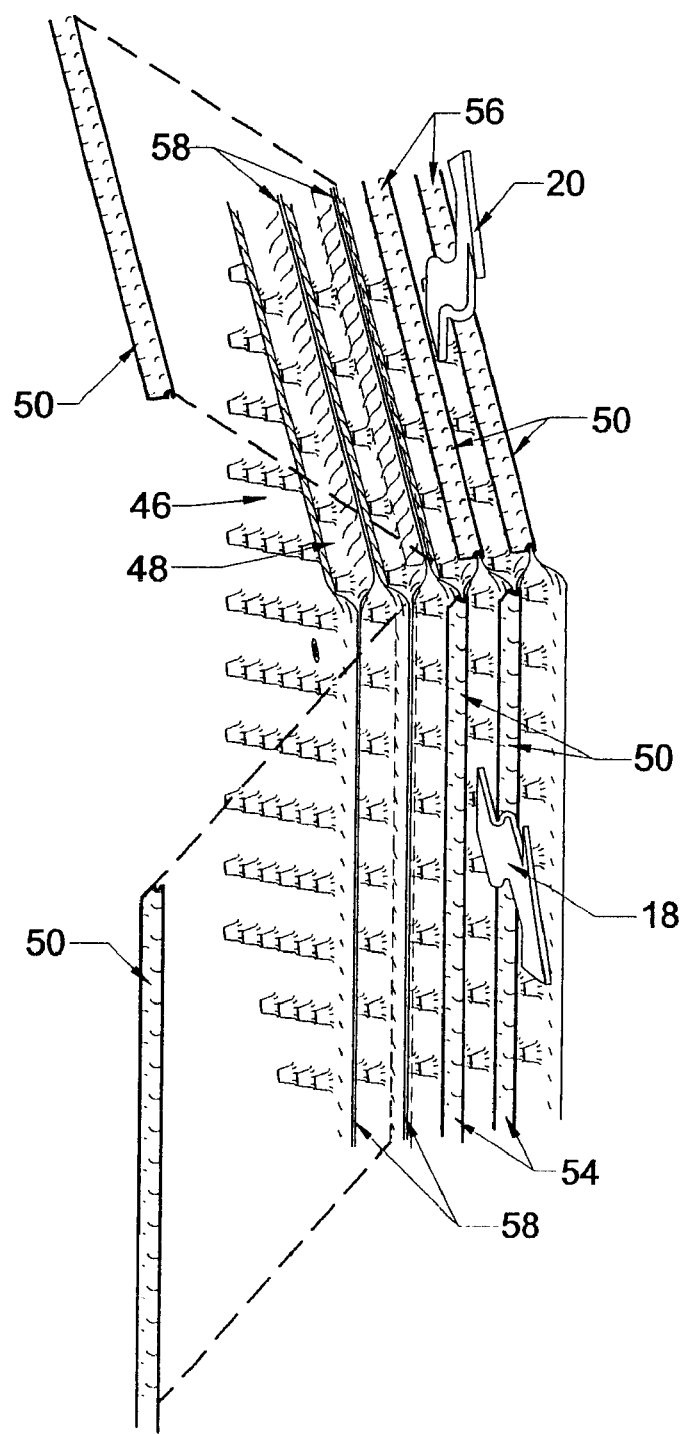
FIGURE −13

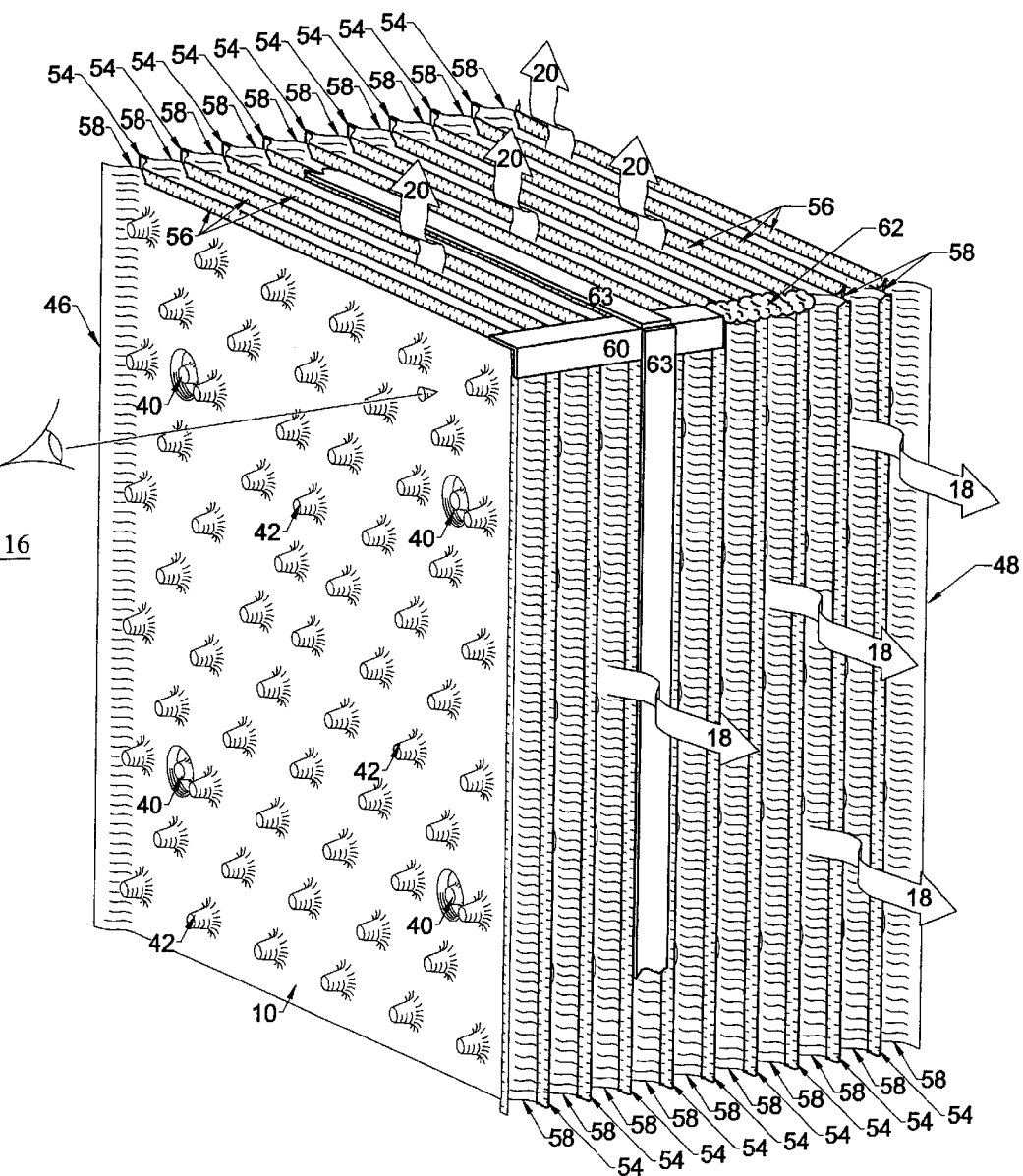
FIGURE −14

FIGURE −15

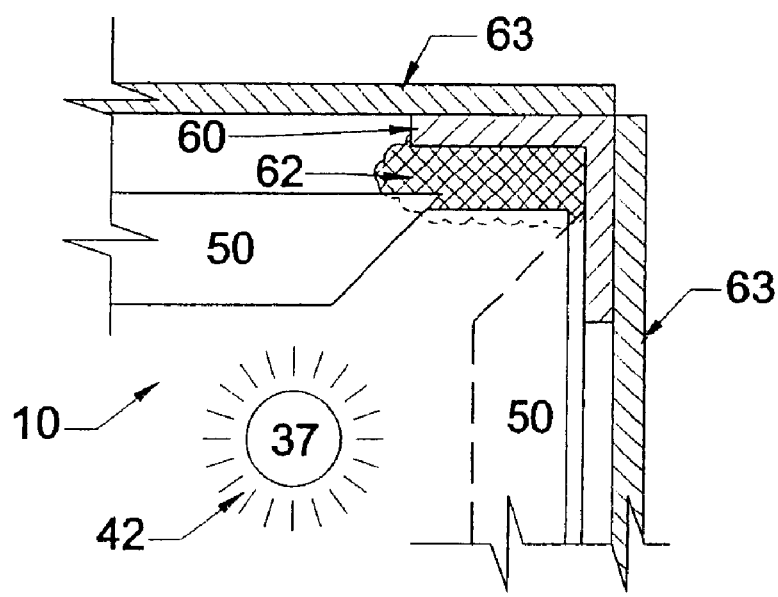
FIGURE −16

TO HEAT EXCHANGER

BACKGROUND OF THE INVENTION

Evaporative coolers or air conditioners are commonly used in dry areas of the world. One drawback of such systems is that even though they reduce the temperature of the air pumped into a space for human comfort, they simultaneously raise the humidity of the air often to the point where the human perception of greater comfort is significantly reduced. It is well known in the air conditioning industry that human beings feel cooler in air which has a lower temperature and humidity than the ambient air. The feeling of greater comfort is partly due to the fact that drier air promotes natural evaporation of moisture through human skin, thereby creating a perception that the air is cooler.

The present invention is an improved flat plastic plate heat exchanger involving the evaporative cooling process whereby the cooler but more humid air from the evaporative cooling process is used as a medium to absorb heat from the air being introduced into the space for human comfort without raising the humidity of that air. Additionally, the heat exchanger enables the air in the space for human comfort to be recycled through the heat exchanger for additional cooling, unlike a plain evaporative cooling system where the air from the cooler goes only once into the space for human comfort and then must be expelled from that space. The heat exchanger may also be used as a precooler for the intake of a conventional mechanical air conditioner, or a conventional direct evaporative cooler, where the precooler does not raise the humidity of the air going into the intake.

The basic components of an evaporative cooling system are a wetable medium (such as a fibrous pad, a sump to hold water, a pump to discharge water over the medium or pad, and a fan to move air past or through the wetted medium. Incoming air of relatively low humidity can thus be cooled by passing over or through the medium and then delivered to a space for human comfort or for cooling. One of the main advantages of a basic evaporative cooler is very low cost.

A heat exchanger is necessary to avoid raising the humidity in the space for human comfort. The preferred embodiment of the present invention involves indirect evaporative cooling because the evaporative cooling takes place when water in the secondary air stream passages absorbs heat from the primary air stream, and then the water is cooled when it evaporates in the secondary air stream in the invention. The heat from the primary air stream is thus transferred through the work of the heat exchanger to the cooler air in the secondary air stream. The heat exchanger can be operated without water in the secondary air stream passages, so that there is direct heat exchange, through the exchanger plates, between the primary and secondary air streams, but the efficiency is much less. However, most heat exchangers of conventional design are difficult to make and seal so that there is no air or water leakage between the two air streams. While metal can be a desirable material for a heat exchanger, it is costly, heavy, and difficult to fabricate and tightly seal. Plastic is a material with a lower index of heat transfer, yet it is very light, inexpensive, easy to fabricate through thermomoulding, yet it is difficult to seal, and may leak, lowering cooling efficiency because of water or air leakage between the two air streams. In particular, conventional flat plate plastic heat exchangers suffer from leaks due to fatigue cracks and thinning in the plates and leaks due to failure of the plate edge seals. Another disadvantage of conventional plastic plate heat exchangers is that the plates tend to deform or sag thus increasing the size of some air flow chambers and decreasing the size of other airflow chambers. It is an object of the present improvement invention to lower or eliminate leaks in plastic plate heat exchangers. It is another object of the present invention to maintain more uniform spacing between the plates of said exchangers. It is another object of the present invention to facilitate uniform assembly of the stack of plates and to provide more uniform plate edge sealing.

Inventions previously known have used plastic plates with more complex construction (U.S. Pat. No. 4,907,648; Mar. 13, 1990 to Emmerich et al.). More complex metal plates with dimples are disclosed in U.S. Pat. No. 5,487,424; Jan. 30, 1996 to Davison; however, this invention has double layer welded metal plates which are costly to make.

BRIEF DESCRIPTION OF THE INVENTION

The preferred embodiment of the invention comprises a stack of square or rectangular plastic plates. The plates are formed of thermoplastic material (preferably a PVC/CPVC composite plastic approximately 8 mils thick with resistance to ultraviolet light and heat) formed by vacuum molding in a heated mold. Heat softens the plastic, and the vacuum draws it over the mold. The mold is quick cooled with water to get a true set and eliminate warping. The mold comprises a flat plate in which there are raised flat top dimples regularly spaced across the flat base. The dimples have large radii curves around the flat top. The diameter of the circular flat top of the dimples can range from 0.1 inches to 0.25 inches, with 0.1618 inches being the preferred embodiment. In addition, the vertical portion of the dimple transitions to the flat base with a large radius curve ranging from 0.0625 inches to 0.1875 inches, with 0.125 inches being preferred, and transitions to the flat top with a large radius curve ranging from 0 inches to 0.0625 inches with 0.03125 inches being preferred. These large radius curves prevent thinning of the plastic during the molding process and reduce later breakage at the curved areas. The flat tops of the dimples provide solid support of the adjoining plastic plate and prevent leakage of that plate which might result from penetration by a dimple with a sharp point. The average diameter of the base portion of the dimples ranges from 0.110 inches to 0.360 inches with the preferred dimension being 0.250 inches. The average spacing of the axes of the dimples ranges from 0.75 inches to 1.25 inches with 1 inch being preferred. The average height of the dimples and consequently the spacing between the plates ranges from 0.125 inches to 0.375 inches, with 0.25 inches being the preferred embodiment. There are two versions of the plates with dimples offset so that they do not nest into the adjacent plate. The heat exchanger comprises a stack of the dimpled plates with the dimples offset from each other in alternate layers to provide a strong series of chambers for the two air flow streams. The two air flow streams flow at right angles to each other through the stack. Alternating pairs of plates are sealed at their opposite edges to create two sets of flow channels for the air streams through the stack. The plate edges are sealed by a 100% silicone adhesive sealant (see page 17) between them, and aerodynamically shaped long U-shaped clips (containing an additional viscous sealant) are pushed over the sealed plate edges and cover most of their length. The U-shaped clips can be made of plastic similar to the heat exchanger plates or various metals of varying thicknesses, but 50 mils for each side of the U-shape is preferred. There are small gaps at all four corners which are not covered by the U-shaped clips. These gaps are sealed by four L-shaped brackets containing a sealant inside the L-shape. The U-shaped clips provide a rigid and uniform interface for the L-shaped brackets and sealants therein. The L-shaped brackets along all four corners of the stack of plates also hold the assembly of plates in the shape of a rigid cube or rectangular solid. The L-shaped brackets are also rigidly attached to metal end plates the same size as the heat exchanger plates, and the L-shaped brackets are also attached together by one or more metal pressure bands around the brackets and stack of plates. The brackets, pressure bands, and end plates provide structural integrity to the stack. In the preferred embodiment, the plates are prevented from moving with respect to each other by two or more alignment lugs which are perpendicular to the plates and consist of a detente which fits over a dimple in the adjoining plate. The invention also includes the process for making the flat top dimples from thermoplastic sheeting in a manner which minimizes later breakage in the thermoplastic sheet, or in the adjacent thermoplastic sheet at the point of contact by the dimples. The invention also includes the method of assembling and sealing the set of dimpled plates to form a leak-proof rigid structure through which the two air streams can flow in proximity to each other and thereby transfer heat from the primary air being introduced into the space for human comfort or process, to the cooled humid air produced by evaporation of water in the secondary air stream within the structure. The invention can be used with many gaseous fluid streams, not just air streams, and it could be used without evaporating water, in which case the efficiency is less.

BRIEF DESCRIPTION OF THE DRAWINGS

Alternate

FIG. 6 indicates a cross-sectional view shown in FIG. 7, which is detailed in FIG. 7, which illustrates the flat-top dimples of the heat exchanger plates separating adjacent plates, and one of the dimples nesting in the alignment detente of the adjacent plate.

FIG. 13 is a perspective view showing how alternating series of adjacent plate edges are sealed to create the two alternating series of airflow passages and how the plate edges are further sealed with the U-shaped clips.

FIG. 14 representatively shows the stack of heat exchanger plates wherein alternating plate edges in the vertical and horizontal plane have been sealed, thereby creating alternating vertical and horizontal airflow channels. In addition, this figure representatively shows the position of the L-shaped bracket across some of the corners of the plate edges, and the sealant under the L-shaped bracket on the edges of the plates. The plates have had their edges sealed and the U-shaped clip applied to the sealed edges. Elevational view shown in FIGS. 14 and 15 is detailed in FIG. 16. This figure shows a U-shaped clip 50 in the vertical dimension extending almost to the corner of the heat exchanger plates, the U-shaped clip in the horizontal dimension extending near the corner of the heat exchanger plates, yet leaving a gap, and said gap being sealed by the sealant under the L-shaped bracket.

Figure 1:
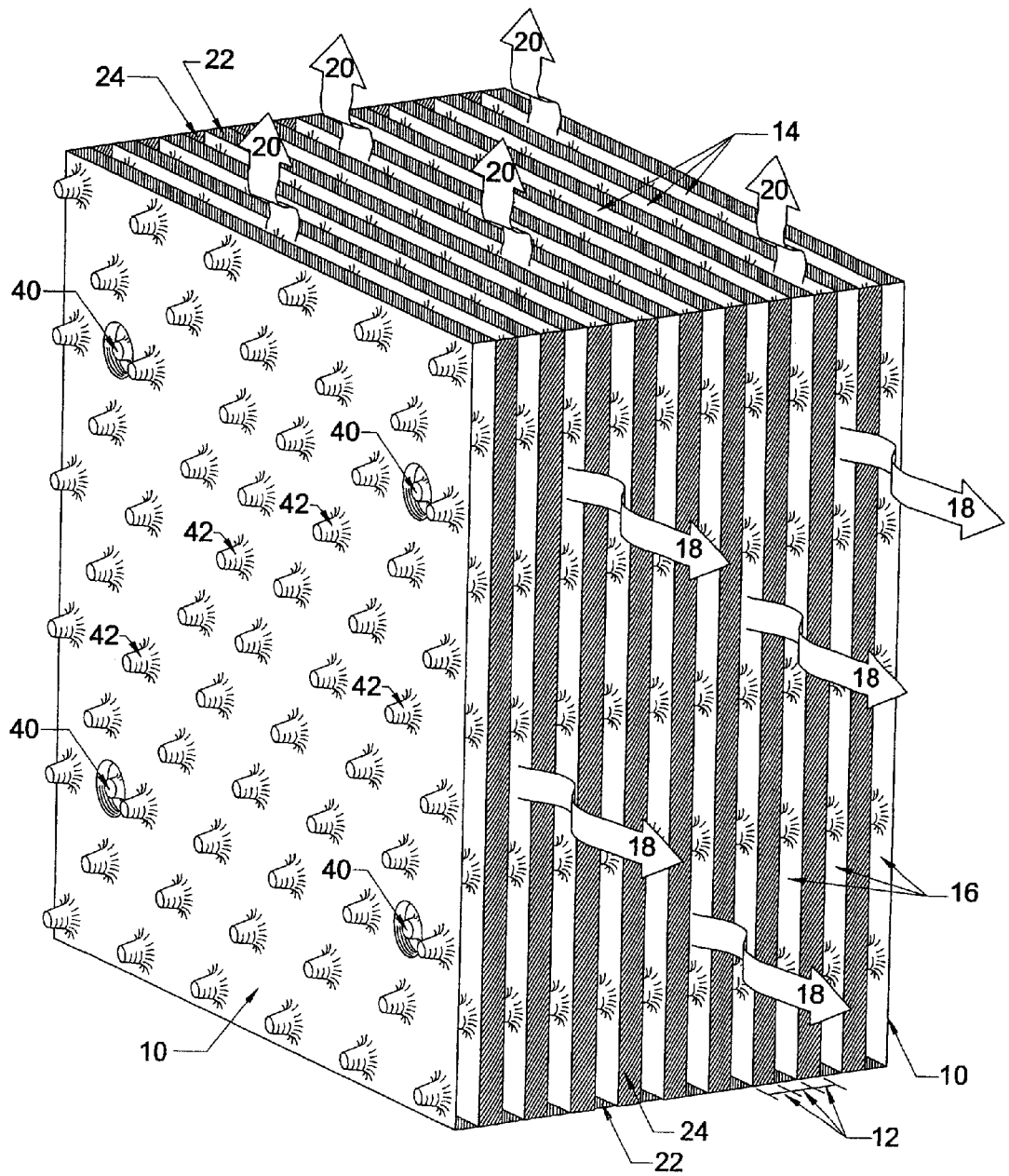
FIG. 1 is a perspective view of the plate assembly of the heat exchanger representatively showing the dimples separating adjacent plates and with the plate nearest the viewer showing the alignment detentes and also showing with undulating arrows the two airflow streams perpendicular to each other in alternating channels through the exchanger.

REFERENCE NUMERALS IN DRAWINGS 10 flat plate
12 standard spacing
14 vertical air passage for evaporative cooling
16 horizontal air passage for cooled air
18 horizontal air flow
19 heat exchanger assembly
20 vertical air flow
22 vertical air blockage
24 horizontal air blockage
26 water drops
28 vertical evaporative air flow
30 heat transfer indication arrows
32 heat contained in discharged vertical air stream, exiting heat exchanger
34 radius corners for structural integrity
36 horizontal cooled air, entering area to be cooled
37 wide flat tops of dimple for support and weight distribution 38 turbulent path of horizontal or vertical air flow
40 alignment detente
42 dimple
44 plate sealant
46 plate type "a"
48 plate type "b"
49 location of dimple of plate below
50 U-shaped clip
52 clip sealing adhesive
54 sealed edges for horizontal air flow path
56 sealed edges for vertical air flow path
58 unsealed gap left by remaining exposed plate edges
60 L-shaped bracket
62 gap sealing adhesive
63 reinforcing bands
64 end plates

SUMMARY OF THE INVENTION

The invention is an improved heat exchanger with a special improved dimple design formed in a stack of otherwise flat plastic plates, wherein the plates are kept separated by the dimples and are alternately sealed with a sealant and U-shaped clips containing another adhesive. The assembly of plates is maintained in the shape of a cube or rectangular solid by improved alignment detentes and L-shaped brackets, which also contain sealants which seal the four corners of each pair of plates in the stack. Sealing of opposite sides of pairs of plates alternately in the stack creates two sets of passages for the two air streams. The U-shaped clips on the plate edges have an aerodynamic shape which reduces resistance to air flow in the two air streams. The invention also includes the method of forming the plates, and assembling and sealing the plates. The preferred embodiment of the invention involves transfer of heat to the water droplets in the secondary air stream and evaporative cooling by water droplets which evaporate directly within the invention. The invention can also be used without the water droplets, in which case the efficiency is less. Compared to previous heat exchangers, the present invention has the following advantages and objects: (1) better seals between the plates, (2) no leakage of air or water between the two air streams, (3) better stability of the distance between plates, (4) better over all dimensional stability of stack of plates, (5) elimination of cracks in the plates, and (6) a simpler alignment detente system to facilitate stacking of the plates during manufacture.

DETAILED DESCRIPTION OF THE INVENTION AND OPERATION

Figure 18:
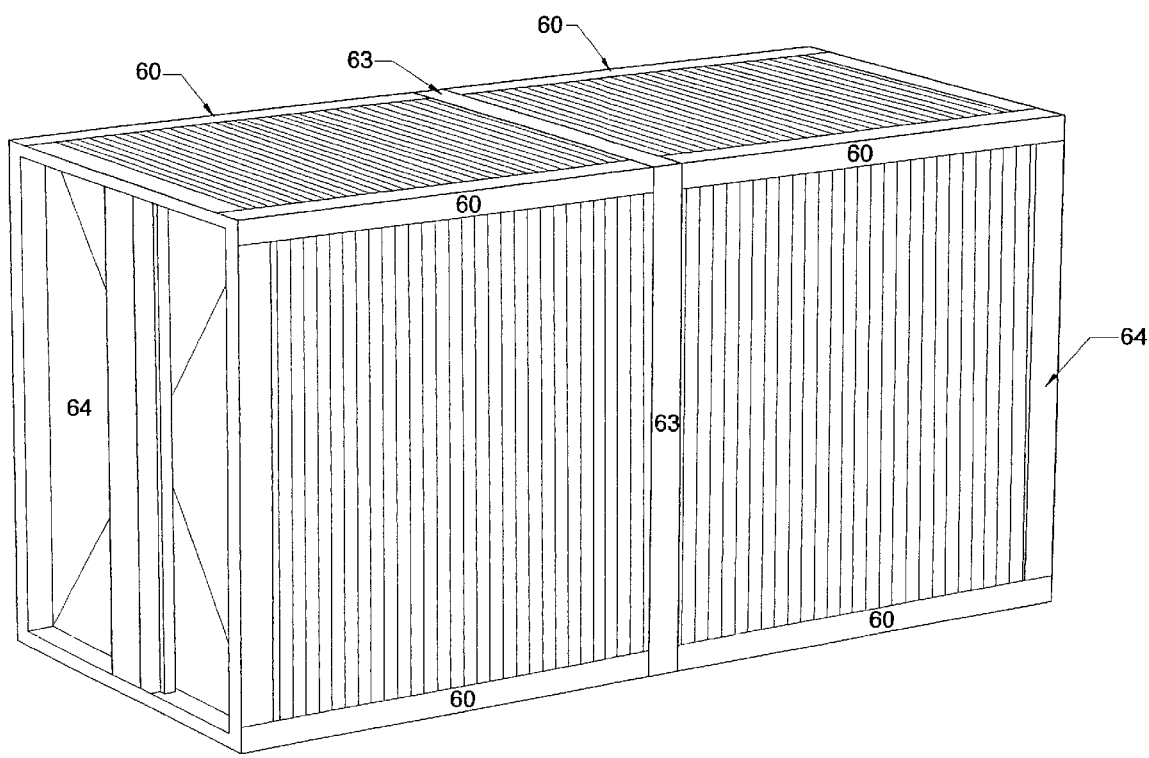
FIG. 18 representatively shows a final configuration of the heat exchanger plates as stacked together and as secured by the L-shaped brackets, end plates, and pressure bands around the entire perimeter of the heat exchanger stack.

FIG. 18 shows one representative configuration of the present invention. The invention as shown comprises a stack of heat exchanger plates here shown in vertical position. The plate stack assembly is held together by end plates 64, generally L-shaped brackets 60, and reinforcing bands 63. The exchanger will typically have the shape of a cube or rectangular solid, but other shapes are possible.

Figure 2:
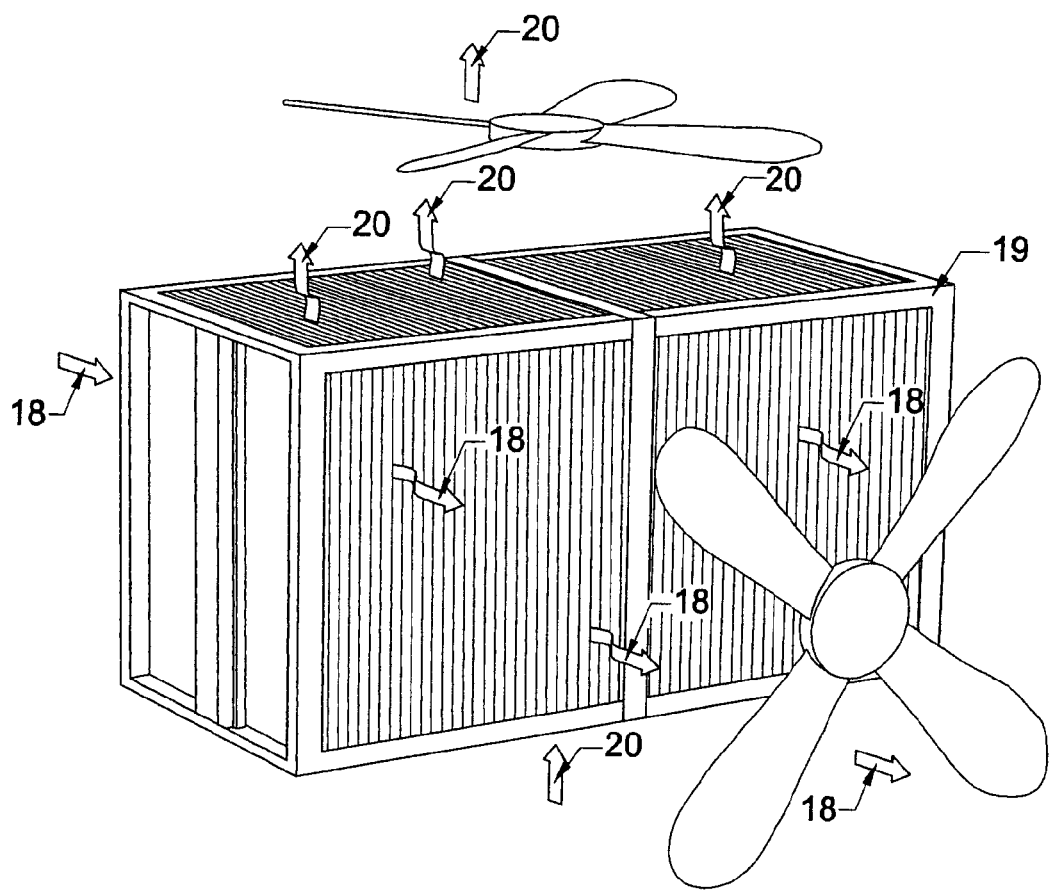
FIG. 2 is a perspective view which representatively shows the final assembly of the plates in the heat exchanger as held together by the L-shaped brackets, the end plates, the pressure strips around the middle of the assembly, the two airflow channels through the heat exchanger and fans representatively showing means to force the two airflow streams through the heat exchanger.
Figure 3:
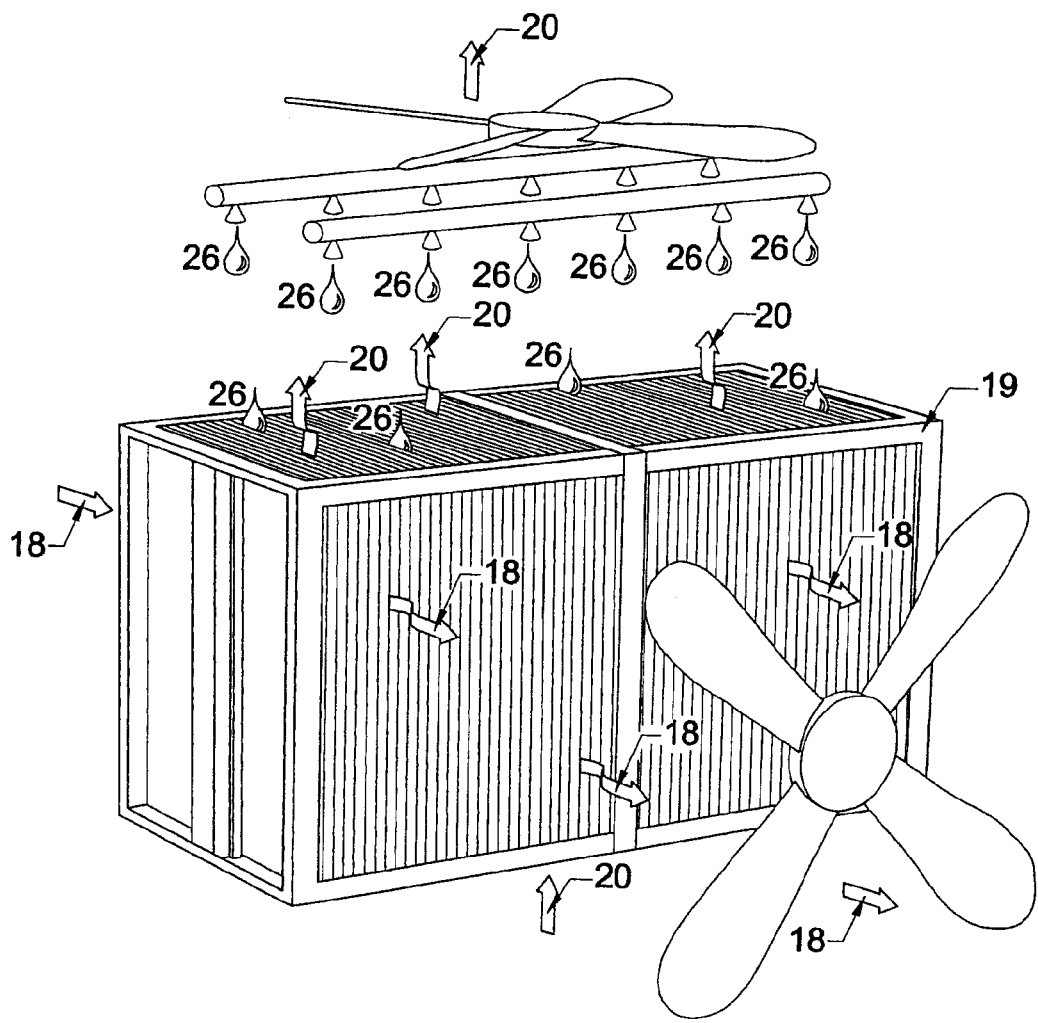
FIG. 3 shows a representative view of water being sprayed into the secondary airflow stream.

FIG. 2 shows in general form how a primary air flow stream 18 moves horizontally through the heat exchanger, and a secondary air flow stream 20 moves vertically. The air streams are moved through the heat exchanger by fans, or similar method, connected to plenums, one plenum being for the primary air flow stream and the other for the secondary air flow stream. The secondary stream 20 typically comprises outside or process air to be expelled, while the primary air stream 18 is comprised of outside air to be introduced to a space for human comfort. The primary air stream 18 may come from outside air or a heat source through ducts or an intake plenum (not shown) on the backside of the heat exchanger in FIG. 2. The cooled primary air stream 18 goes to the process cooling load or space for human comfort through the fan or other means for air movement, and ducts and fan plenum, not shown. FIG. 3 shows a means for spraying water droplets into the secondary air stream 20 for evaporation within the invention. The secondary air stream 20 need not have an intake or outtake plenum, and typically comprises ambient air or recirculated air. Any unevaporated water droplets are expelled from the exchanger, at the top as shown in FIG. 2.

Figure 12:
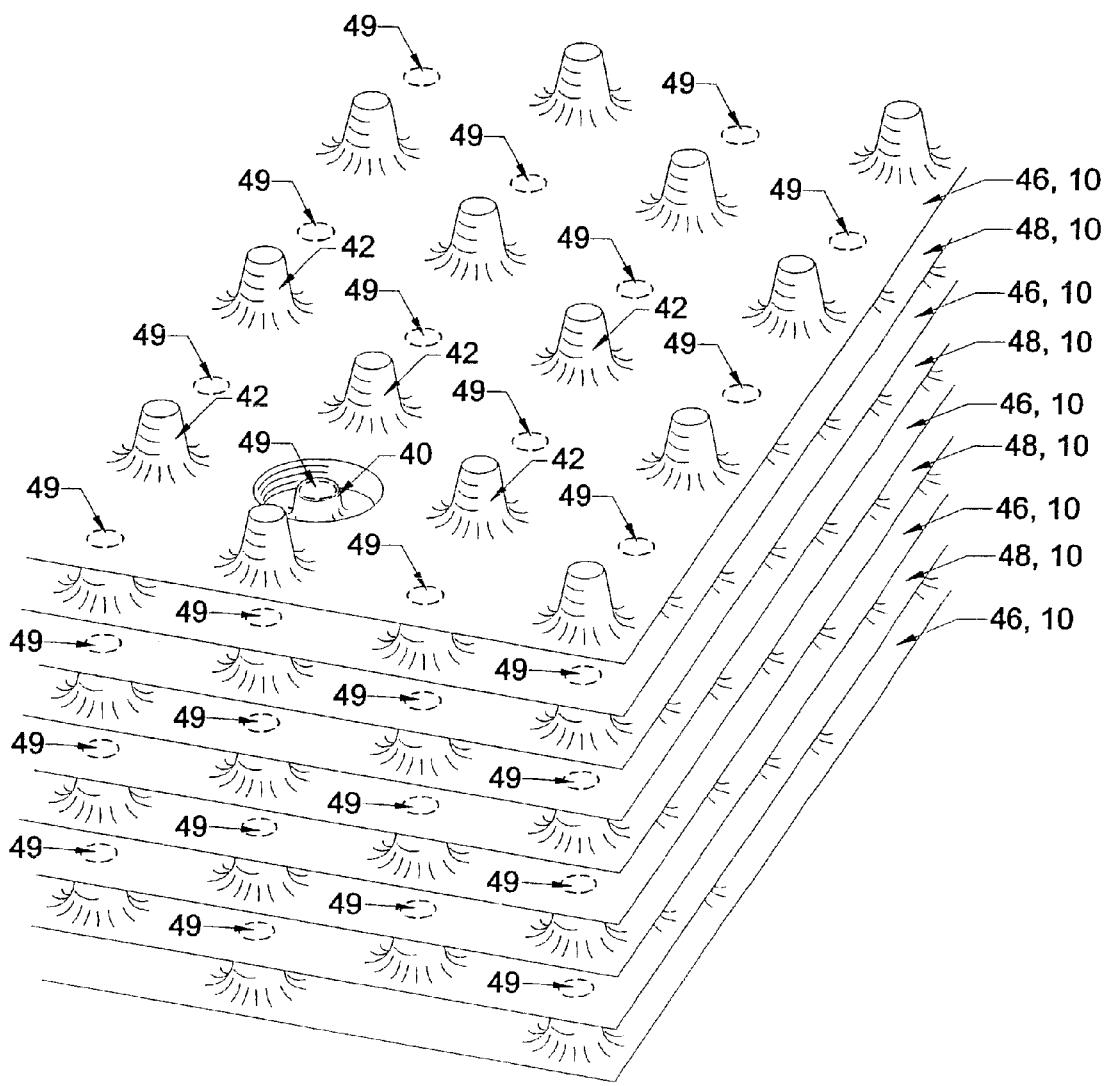
FIG. 12 shows in a perspective view how the two types of plates are stacked so that the dimples do not nest into the plate above, and how a few dimples do nest into the alignment detentes of the plate above.

FIG. 12 shows the basic construction of the stack of plates. The plates are separated by typically flat-topped dimples 42 molded into the plates. Element 49 shows the top of the dimple of the plate below positioned up against a given plate. At selected points in the stack, an alignment detente 40 has been molded into the plate so that the top of the dimple from the plate below nests in the detente to prevent the plates from moving with respect to each other. FIG. 12 shows one such detente 40 molded in the top plate shown, and elements 49 show how the top of the dimple from the plate below nests in the detente, and how the remaining dimples support the top plate.

Figure 6:
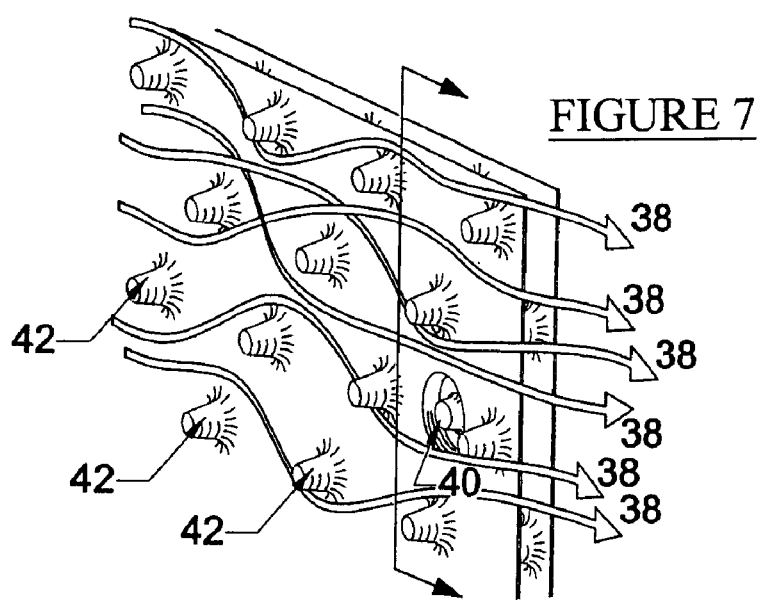
FIG. 6 shows the turbulent airflow around the dimples in the horizontal airflow stream.
Figure 7:
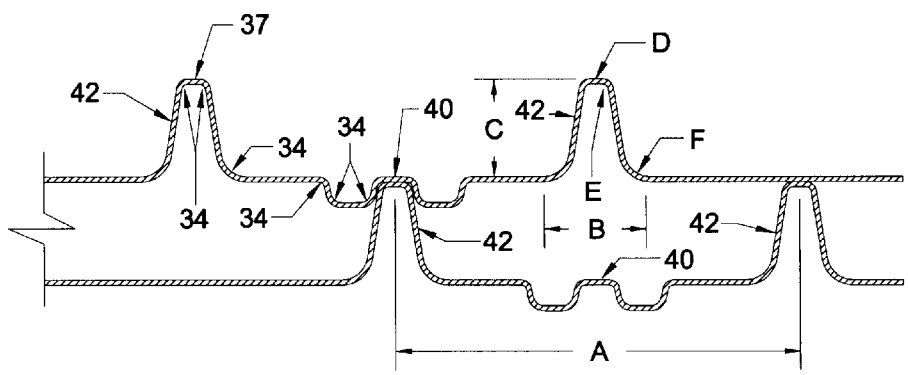

FIG. 6 and FIG. 7 show detail of how the dimples and alignment detentes are positioned in the stack of plates. FIG. 7 shows two dimples 42 in the lower plate. One dimple 42 touches the plate above where it is flat. One dimple 42 in the lower plate nests into alignment detente 40. The alignment detente 40 is surrounded by a raised donut shaped area the center of which is coincident with the center of the detente 40. The lower plate has a detente 40 to receive a dimple from a plate below. FIG. 7 in the upper plate shows two dimples 42 which would touch, support, and maintain spacing with a plate above, not shown. FIG. 7 also shows large radius curves 34 and large flat tops 37 of the dimples, which are an important part of the invention because the flat tops provide support for the plate above and weight distribution over a wide area of the plate above, thus greatly reducing the likelihood that a dimple will puncture or crack the plate above at the region 49, where the dimple touches the plate. The large radius curves 34 insure that the plates will not crack due to heat and mechanical stress at the points of curvature. The plates are stacked by hand and the assembly is stabilized with structural acrylic adhesive (see below) in the alignment detentes.

The present invention also includes the process of producing the plates with the above desirable characteristics as follows. A PVC/CPVC composite plastic, which is resistant to fatigue and ultraviolet light, typically about 8 mils thick, is heated in a furnace and then positioned over the mold and drawn onto it. The mold has large radius curves and flat top dimples shaped into the mold. This plastic is a rigid homopolymer vinyl film manufactured by Klockner Pentaplast of America, Inc., 3585 Klockner Road, Gordonsville, Va. 22942. The plastic sheet is drawn to the mold through a vacuum process well known in the art. The large radius curves 34 prevent thinning of the heated plastic which could later produce cracking and air and water leaks. Before the plastic is released from the mold, the mold is water cooled to prevent warping of the plastic as it is removed from the mold. The water cooling is an important part of the invention.

FIG. 1 shows a stack of plates 10, dimples 42 separating the plates, detentes 40, vertical air passages 14 and horizontal air passages 16. It also shows vertical air blockage 22 and horizontal air blockage 24, more fully explained below. Also shown are vertical air flow 20 and horizontal air flow 18. Element 12 is the standard spacing between plates which can vary from between ⅛ inch to ⅜ inch depending on cooling efficiency and air flow speed desired.

FIG. 13 is a corner perspective view showing how adjacent plates are sealed in alternating fashion between the two corner faces shown so that alternating air flow spaces, for horizontal airflow 18 and vertical airflow 20 are formed in the stack of plates. The U-shaped clips 50 provide an additional seal when inserted over two previously sealed plate edges. The two alternating plate types 46 and 48 are also shown.

Figure 11:
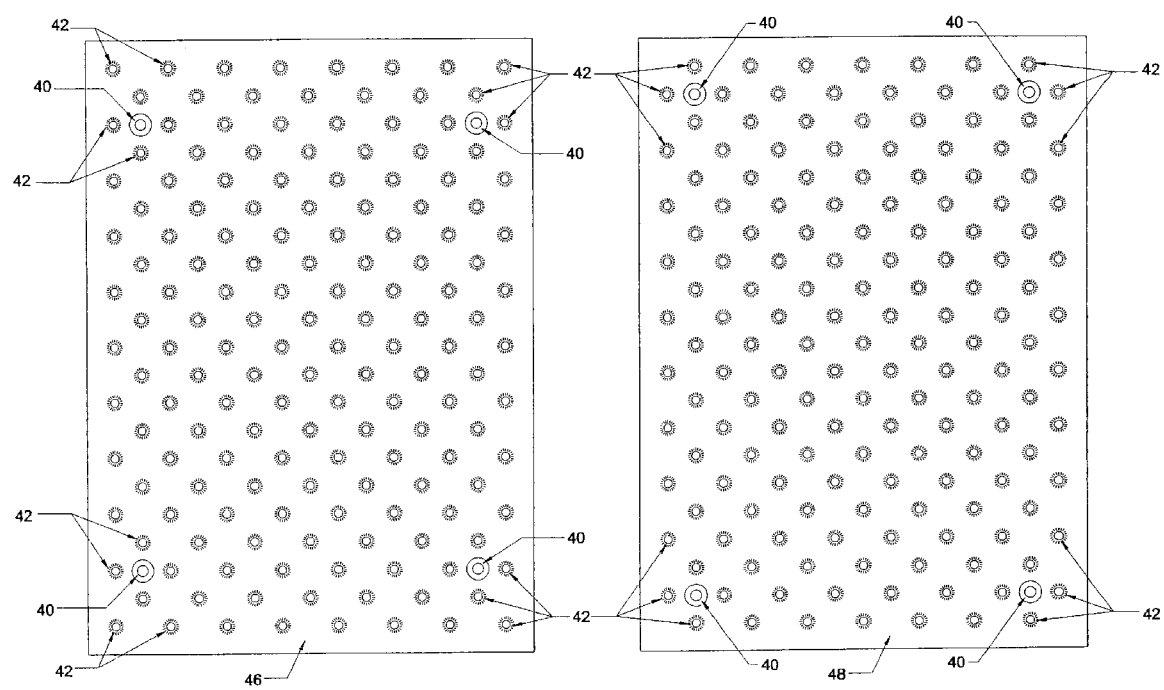
FIG. 11 is a representative view of the heat exchanger plates showing the two kinds of plates with two dimple configurations so that the dimples of one layer do not nest into the dimple bases of the adjoining layer. It also shows alignment dentente 40, where the top of a dimple from the plate below does nest into the detente. In addition, the top plate in this view shows the molded alignment detente into which a dimple molded in the plate below nests.

FIG. 11 shows the two types of plates 46 and 48 which are stacked alternately so that the dimples, 42 do not nest into the dimples in the plate above, yet some dimples nest into the alignment detentes 40 in the plate above.

FIG. 14 shows the stack of plates 40 with the plate edges 46 and 48 sealed alternately so that in the plane of FIG. 14 nearest the viewer, horizontal air flow is alternately blocked and allowed by the method of sealing the plate edges described below. FIG. 14 shows on its top face how vertical air flow is alternately blocked and allowed by the method of sealing the plates described below. After the stack of plates with the structural acrylic adhesive sealant in the alignment detentes has cured, the plate edges are sealed.

Figure 8:
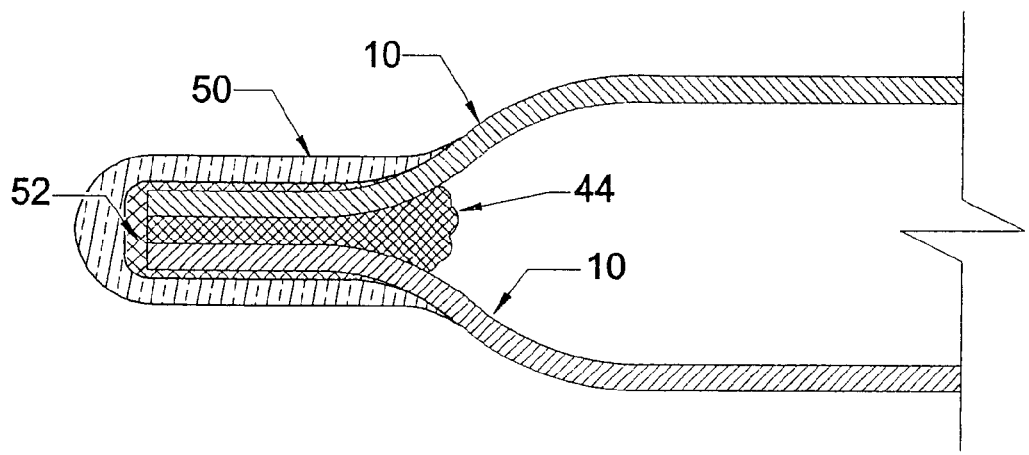
FIG. 8 shows the U-shaped clip with its own internal adhesive sealant in position over the sealed plate edges, said edges being sealed by the plate edge sealant.
Figure 9:
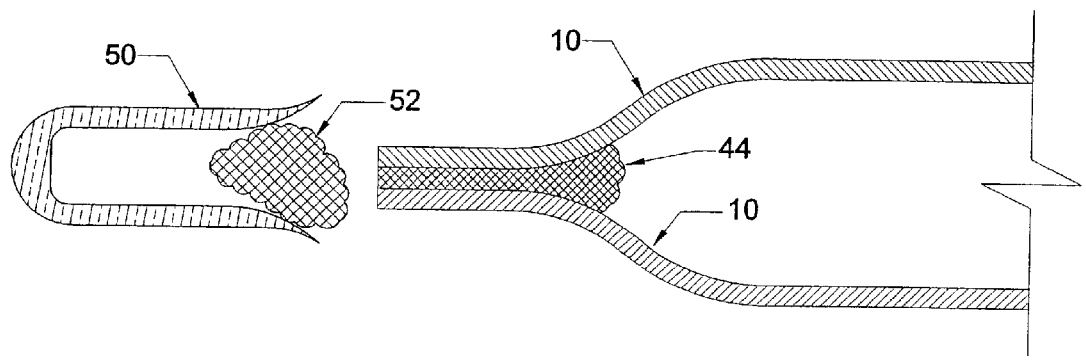
FIG. 9 shows the sealant in place between the two compressed plate edges and the U-shaped clip loaded with adhesive ready for positioning over the two sealed plate edges.
Figure 10:
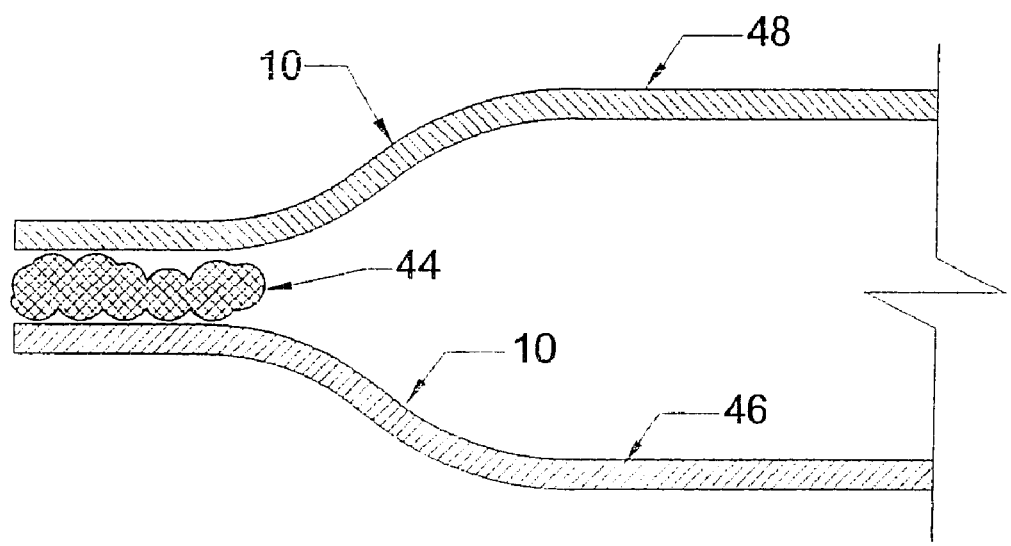
FIG. 10 shows the edges of two adjacent plates having been pulled together and a sealant applied between the two plate edges.
Figure 17:
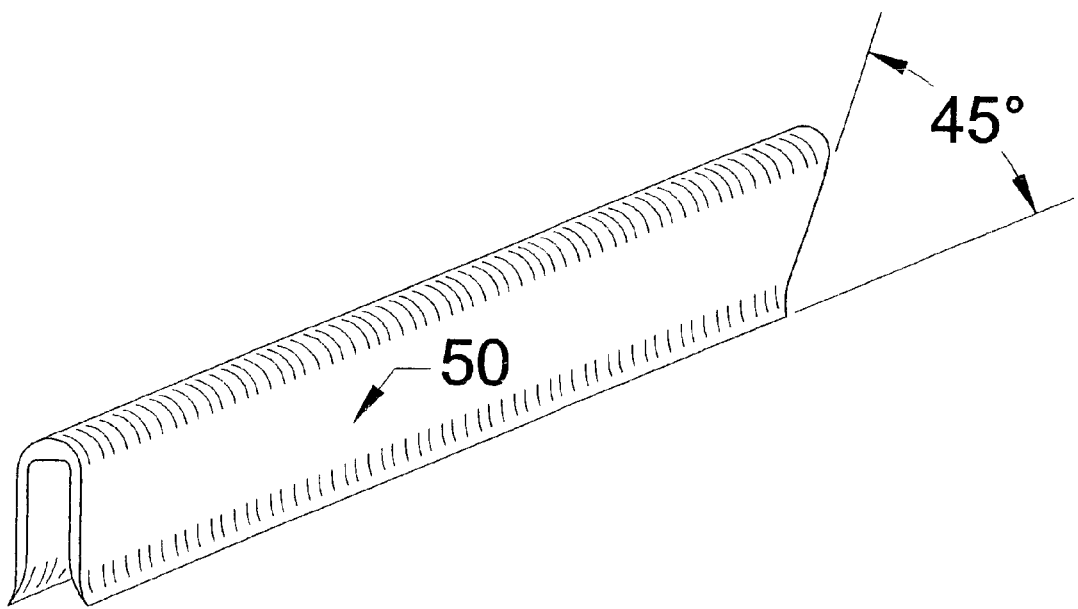
FIG. 17 is a detailed perspective, representative view of the U-shaped clip, showing its curved aerodynamic shape and its angle cutaway at the end to allow for two U-shaped clips to meet near the corner of the heat exchanger.

FIG. 10 shows how two adjacent plates 48 and 46 are sealed at their edges. The plate edges are compressed together by various methods and sealed together with plate sealing sealant 44, which is 100% silicone sealant, Owens-Corning Product #832 made by Dow-Corning Corporation, Midland, Mich. 48686. FIG. 9 shows the sealed plate edges being further sealed by an aerodynamically shaped, typically extruded clip 50 generally in a U-shape with a clip sealing adhesive 52 contained inside it. This sealant is typically the structural acrylic adhesive, "Flex Welder" by Devco, 30 Endicott Street, Danvers, Mass. 01932 which forms a chemical bond with a plastic of the plates, which is as strong as the plate material. FIG. 8 shows the U-shaped clip 50 with its adhesive 52, having been pushed over the edges of the plates 10, which have already been sealed together with sealant 44. Thus, the seal is very strong, since there are two barriers of sealants, 44 and 52 and since adhesive 52 chemically bonds, or fuses, to the plastic plates 10, and to the plastic clips 50. The U-shaped clips 50 keep the sealed edges of the plates 10 uniform, parallel and structurally sound. The pressure exerted by the U-shaped clip on the plates to be sealed ensures a tight seal and virtually eliminates warping of the plate edges caused by solvents in the sealant between the plates. FIG. 14 shows how the plate 10 edges are sealed in alternating fashion to create alternating vertical and horizontal air flow. Elements 56 are the edges of the U-shaped clips 50, which seal the plate edges for vertical air flow. Elements 54 are the edges of the clips 50, which constitute the sealed plate edges for the horizontal air flow path. Elements 58 are the unsealed gaps for the horizontal and vertical air flow streams 18 and 20 in alternating fashion. FIG. 17 shows the extruded clip 50 with smooth aerodynamic shape, generally a U-shape, with a cut out at the end of approximately 45 degrees to prevent inference between horizontal and vertical clips where they meet at the corners.

FIG. 15 is a close-up perspective view of the corners of the stacks of plates with U-shaped clips in place on the plate edges, and showing how the L-shaped bracket 60 and gap sealing adhesive 62 are applied to make the final sealing of the stack. The position of FIG. 16 is indicated in FIG. 15 and detailed in FIG. 16.

Figure 16:
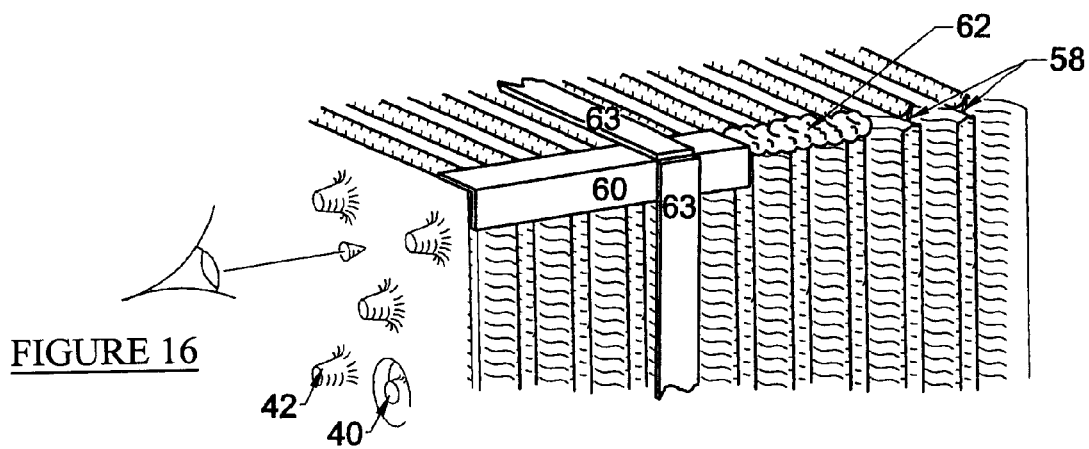

FIG. 16 is based on FIGS. 14 and 15 and shows a dimple 42 with flat top 37. Two U-shaped clips 50 (with edge angle approximately 45 degrees) are in position over the edge of the plate 10. Referring back to FIG. 14, the generally L-shaped angle brackets 60 and its gap sealing adhesive 62 are positioned over the plate corner. Sealant 62 is typically isobutylene tripolymer type adhesive approximately one and one half inches wide available from Sika Corporation, 4800 Blue Parkway, Kansas City, Mo. 64130. FIG. 16 shows the generally L-shaped bracket 60 and adhesive 62 sealing the corner of plate 10 in the horizontal axis and providing strength and positioning for the plate stack, while allowing the unsealed gap 58 (FIG. 14) in the plate edges in the vertical axis. The vertical clip 50 is shown partially dotted because it is mostly beneath the plate 10. Reinforcing bands 63 between the adjacent L-shaped brackets are also shown.

Figure 4:
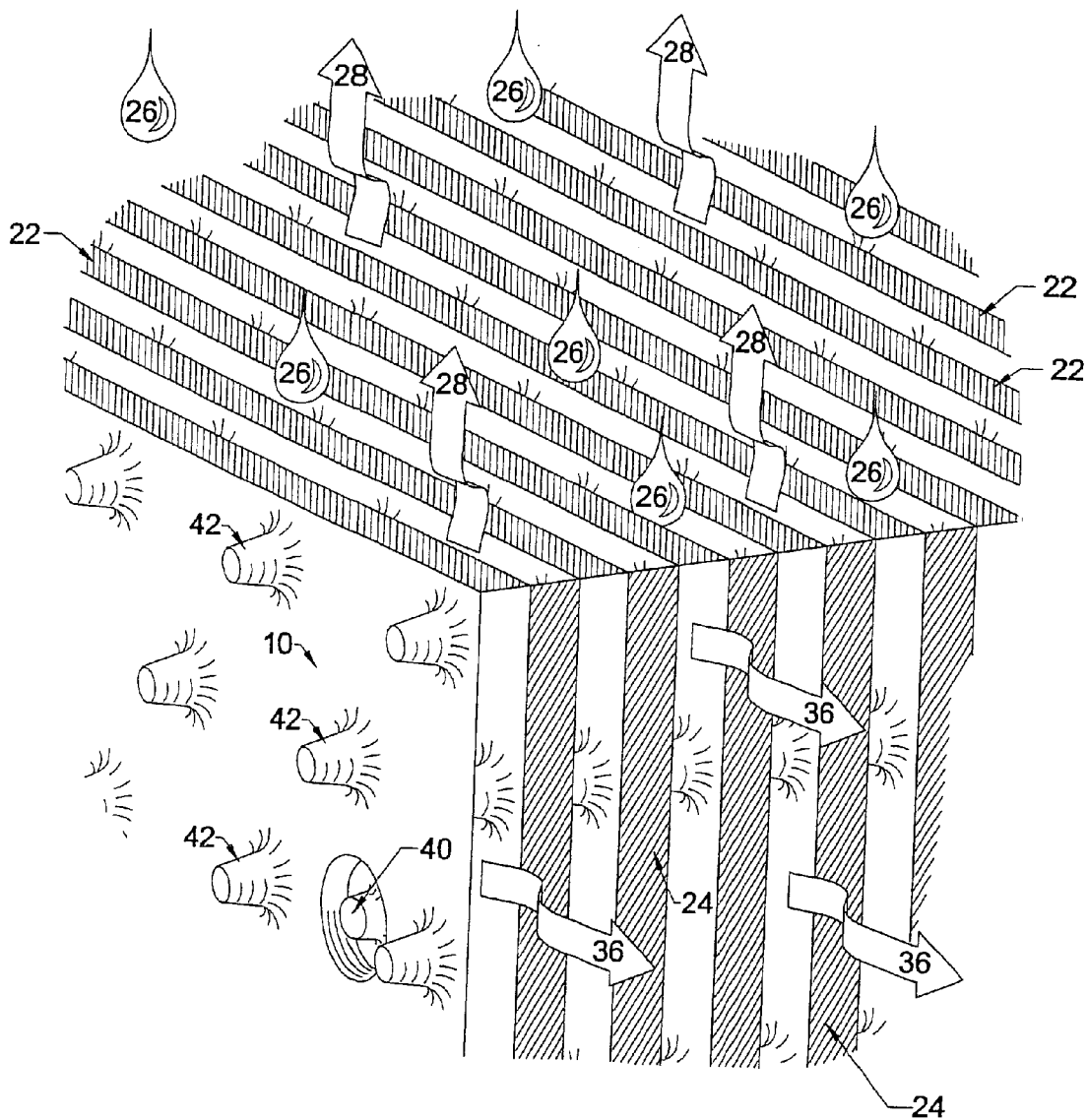
FIG. 4 is a perspective view of the plates of the heat exchanger, representatively showing the two airflow channels with the primary and secondary airflow streams moving perpendicularly to each other and water droplets in the secondary airflow stream indicating evaporation of water in the secondary stream.
Figure 5:
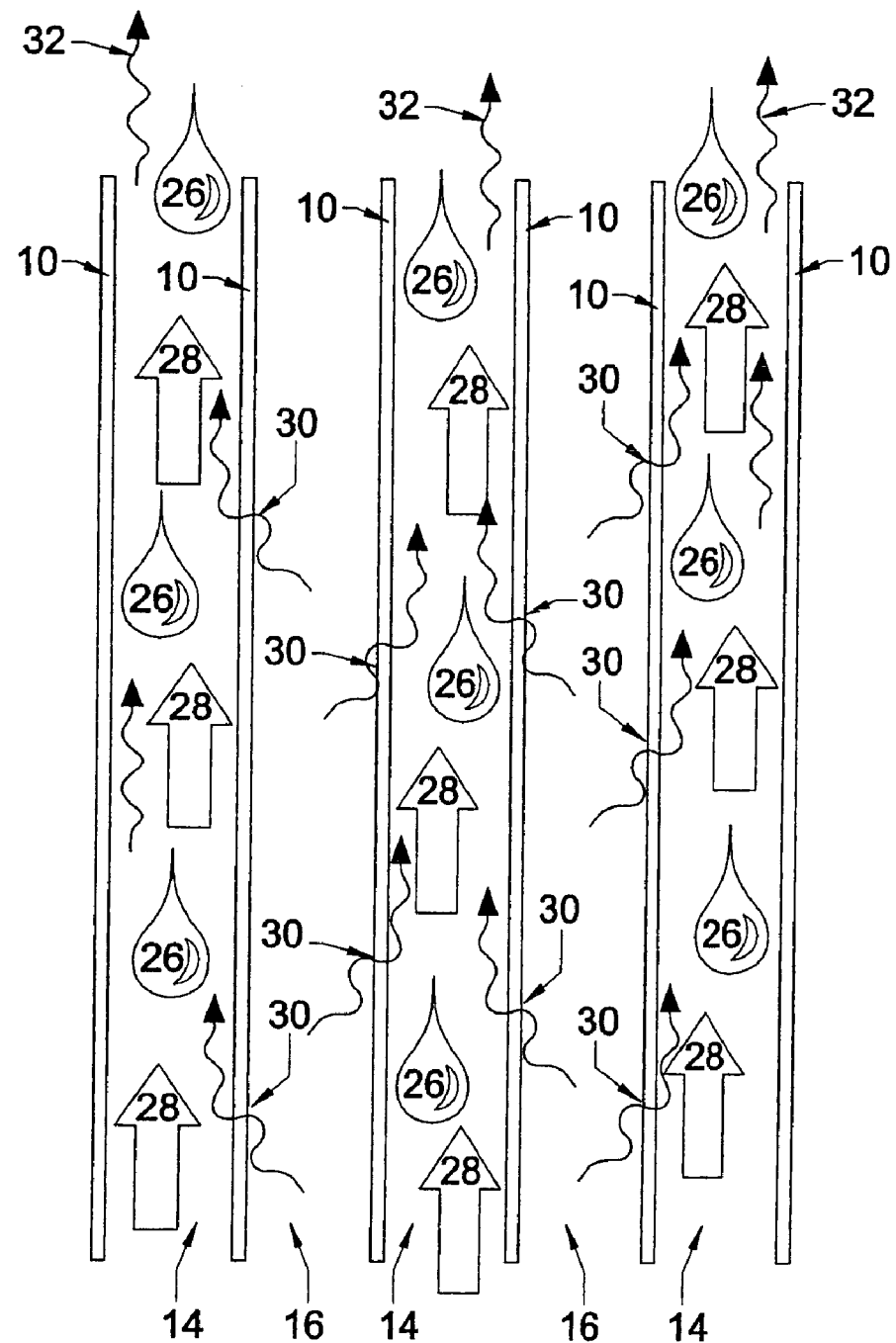
FIG. 5 is a cross-section view of the preceding figure showing the two airflow streams moving in alternating fashion, the water droplets contained in the secondary airflow stream for evaporation, and undulating arrows showing heat exchanged between the primary airflow stream and the cooler secondary airflow stream.

The above describes how alternating horizontal and vertical air flow channels are produced by the stack of plates. The following show the heat exchange between the two air flow streams as well as evaporative cooling in the secondary air flow streams. FIG. 4 is a perspective view which shows the preferred form of the invention with water drops 26 in the secondary air flow stream. The drops 26 wet the plate surfaces and then evaporate in the secondary air stream 28 within the heat exchanger, thus lowering the temperature of the secondary wetted passages. The cooler wetted surfaces absorb heat through the plates 10 from the horizontal air stream, which then goes to the area to be cooled, either a space for human comfort or a source of heat in process cooling. FIG. 5 is a cross-sectional view of the plates and process in FIG. 4. Arrows 28 show the vertical evaporative air flow in which drops 26 evaporate and produce cooling. Air flow 28 is moving in alternate passages 14 (FIG. 1) of the heat exchanger. Arrows 36 (FIG. 4) are the primary airflow in alternate passages 16 moving toward the viewer. In FIG. 5, undulating arrows 30 show heat moving through the plates 10 from the primary air stream to the secondary air stream, which is cooler than the primary air stream. In the preferred form, the wet secondary passages are further cooled by evaporating water droplets. Undulating arrows 32 represent heat transferred by evaporation to the secondary air stream 28, which exits the heat exchanger and is dispensed into the ambient air.

DESCRIPTION OF RELATED ART

In addition to patented heat exchangers, related art which has been publicly used for varying periods of time has some similarities to the present invention; however, the present invention has major advantages and differences as previously and hereinafter set out.

Figure 19:
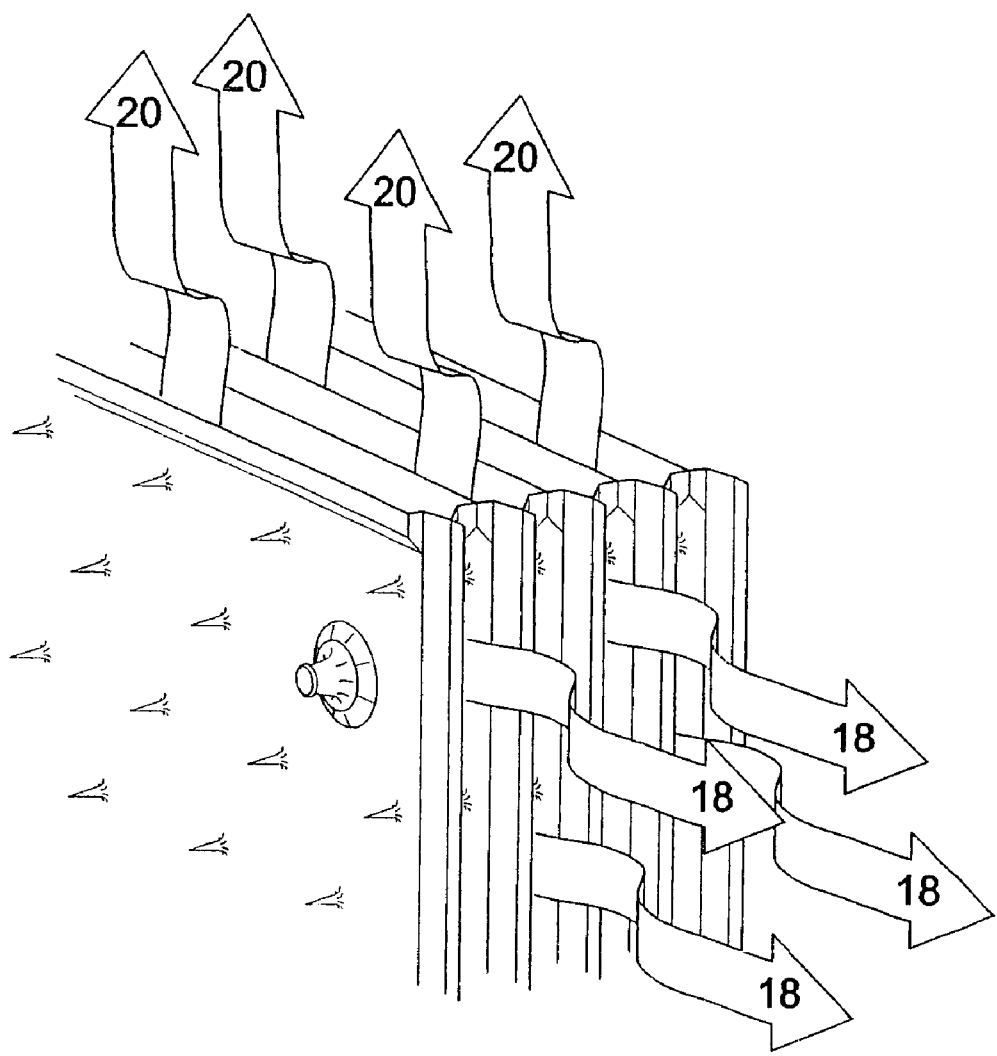
Figure 20:
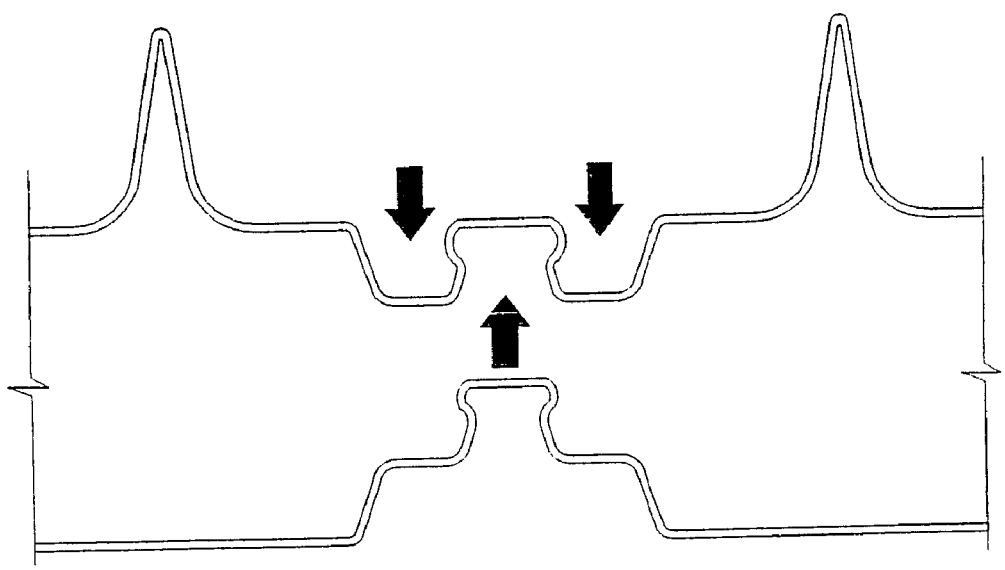
Figure 21:
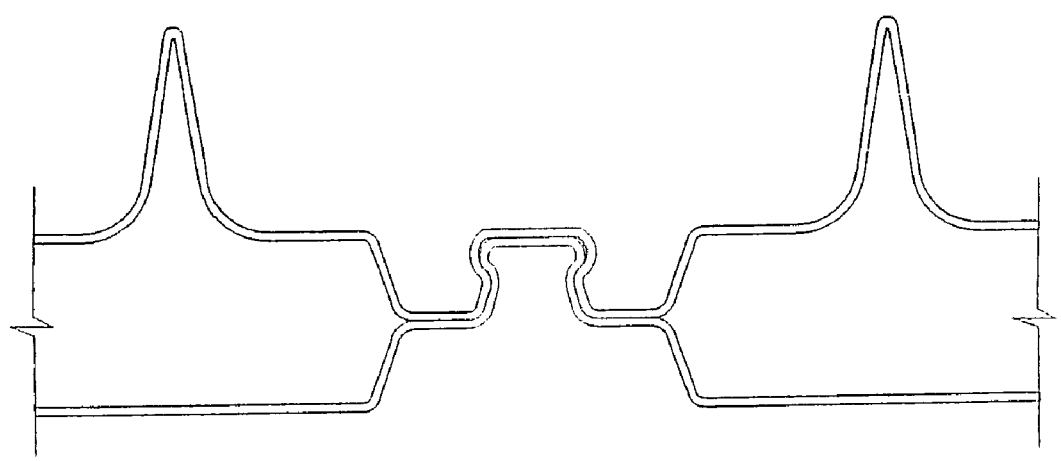
Figure 22:
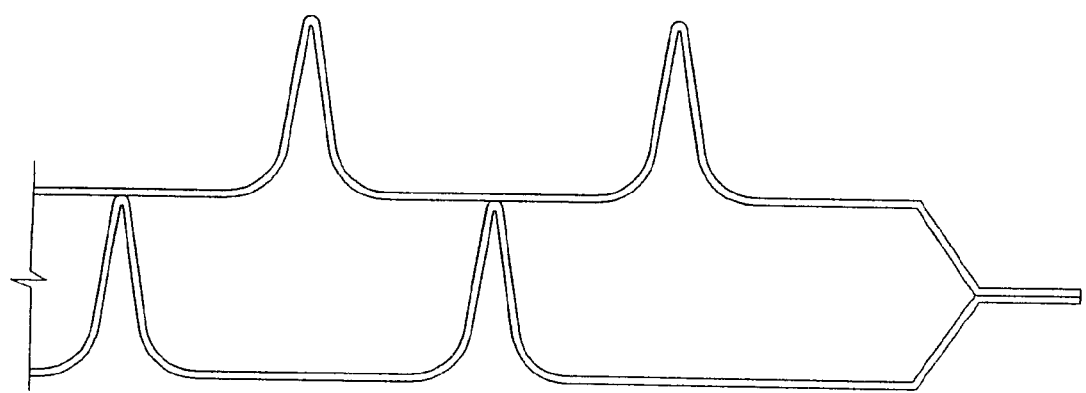

Other heat exchangers also use stacks of plastic plates (with composition like those of the present invention) with alternating sealed air passages for two fluid flow streams. However, the related art uses dimples shown in FIG. 22 and FIG. 19 which are pointed and have small radius curves which cause the dimples to fracture and which cause the dimples to puncture the adjacent layer at the point of contact, in both cases often causing significant leaks. Related art has snap-together alignment lugs as shown in FIGS. 20 and 21, which are more complex to form and more readily crack because of small radius curves, and which are harder to assemble because of the need for the snap fit. The present invention uses nesting of a dimple into an alignment detente secured by adhesive for plate alignment and ease of assembly of the plate stack.

The edges of related art exchangers in one case have an offset or bend so that they naturally touch when the plates are stacked. A layer of sealant is brushed between the touching plate edges, resulting in lack of uniformity and thickness of the sealant, and consequently leaks. The present invention involves compressing the edges of adjacent plates where one plate has a continuous bead of sealant on it, thus producing a more uniform and reliable seal. The plate edges are further secured with the U-shaped clip containing an adhesive. This method produces a double seal barrier which is virtually leak proof unlike related art exchangers. The related art heat exchangers are sometimes further sealed by tilting them at an angle and pouring liquid sealant inside the device at the point where the plate edges are sealed together. However, the process is unreliable because the flow of sealant cannot be seen, and its uniformity and proper placement cannot be verified. Thus, leaks are more likely because the related art devices do not use a U-shaped edge clip, their plate edges are not uniformly aligned, are non-parallel, and leak. The sealant used does not chemically bond to the plate like the sealant used in the present invention, which cannot be pulled apart without breaking the plastic plates. Related art exchangers use a snap together alignment detente which is more difficult to form in the plate, takes up more plate area, and is more prone to cracking and leaking.

As to the process for making the invention, the plates of the related art heat exchanger are also softened by heat and then drawn over a mold with vacuum. However, the process of the present invention uses a mold that is quick cooled with chilled water to get a true set of the plastic sheet against the mold to prevent warping and thinning of the plate when it is removed from the mold. The related art heat exchangers have a final seal at the corners produced by dipping the corners of the assembly into a vat of sealant or by adding sealant with a glue gun, both less reliable methods which are likely to cause leaks.

OPERATION OF THE INVENTION

The following description of the operation of the invention is capable of some variations without departing from the invention. Not all aspects of the improvement need be used in an exchanger at the same time.

The heat exchanger of the present invention can be used to transfer heat between any two fluid streams of reasonably low viscosity. The primary fluid stream enters alternate layers of the stack of plates shown in FIG. 2. The fluid streams are not impeded by the edge of the plates because of the aerodynamic shape of the U-shaped clip used to seal the plate edges. The secondary fluid stream enters the stack of plates into alternate layers of the stack of plates, which alternate with the layers in which the first fluid stream is moving. The fluid streams in the preferred embodiment of the invention move essentially at right angles to each other through the stack of plates. Heat is transferred from, for example, the warmer primary fluid stream to the secondary cooler fluid stream because heat flows through the plastic plates separating the fluid streams. Also, water in the secondary passages absorbs heat from the primary air stream, and then the water is cooled by evaporation in the secondary air stream. The fluid streams are separated by the plates which are sealed with sealant between the plates and also sealed by means of U-shaped clips containing an adhesive which chemically bonds with or fuses with the plates and clips and L-shaped angle brackets containing a sealant. In the typical application of the heat exchanger to an evaporative cooling system, the warmer first air stream comes from the outside and the cooler second airstream is created when the water in the second stream evaporates into the second air stream, typically consisting of outside air or from the space for human comfort through ducts connected to a plenum connected to the invention, as described elsewhere in this application. The cooler airstream contains water droplets which are evaporating, but, due to the great seal integrity in the heat exchanger of the present invention, neither the water droplets nor the humidity in the cooler air stream can enter the warmer airstream. In this way, the cooling effect of evaporative cooling can be introduced into the space for human comfort, or process cooling, without raising the humidity of the air in the space for human comfort, or process cooling. Likewise, air from the space for human comfort can be recirculated through the secondary wet side of the heat exchanger for energy recovery without raising humidity of the air in the space for human comfort. This overcomes two of the major drawbacks of an evaporative cooler, namely that it raises the humidity in the space for human comfort which often reduces the perceived cooling effect by the people in that space, and the temperature drop produced by the evaporative cooler is limited by the humidity of the air going into the cooler.

As to the method for forming the special dimples in the plates of the invention, the process comprises fairly standard vacuum heat forming of a plastic sheet onto a mold. The special part of the invention comprises a mold with dimples with large radius curves and flat tops, thus reducing the thinning of the plastic sheet during the molding process. Lack of thinning of the plastic prevents cracks in the heat exchanger plates, and the flat tops of the dimples prevent cracking of the adjacent flat part of the adjacent plate in contact with the top of the dimple. Plastic thinning is also reduced by water cooling of the mold before the molded plastic sheet 15 is removed.

As to the method for sealing the plates, the special part of the sealing of the heat exchanger comprises multiple sealing of the plate edges, first by a uniform bead of nozzle-injected sealant between the plates of a special kind which adheres to the plastic plates and, secondly by pushing onto the sealed, plate edges long generally U-shaped clips containing a chemically bonding or fusing adhesive. The best mode for use of the invention is as a precooler before the intake of a conventional mechanical cooler, or a conventional evaporative cooler, or as a heat exchanger to recirculate and further cool air from a conditioned space without raising the humidity of the air.

CONCLUSIONS AND RAMIFICATIONS

Variations are possible in the invention regarding the number of plates, thickness of plates, material of plates, spacing of plates (that is, height of dimples), area and shape of the plates, number of dimples per given area of plate, area of the flat top of the dimple compared to its base. The shape and configuration and composition of the U-shaped clips can be varied, including their aerodynamic profile and the way the U-shaped clips are arranged on the plate. The clips may be made of extruded metal, molded plastic, or of other materials. For example, the clip may extend fully from one end of the plate to the other, or it may extend only to a point approximately one inch from the end of the plate; or the clip may cover the entire edge of the plate in the vertical axis, but only part of the plate on the horizontal axis. In addition, several different sealants can be used between the plates provided that they adhere to the plastic plates, and several chemically bonding or fusing adhesives can be used inside the U-shaped clips, and several other sealants can be used inside the L-shaped brackets. Various embodiments of the invention are possible without departing from the scope of the invention. Therefore, the drawing and descriptions are illustrative of possible embodiments, and are not restrictive.

The scope of the invention should not be determined by the embodiments illustrated, but by the appended claims and their legal equivalents.

We claim:

1. A flat plate plastic heat exchanger with a stack of flat plates, comprising:

(a) a plurality of dimples with relatively large flat tops and a vertical portion molded into the plates of the heat exchanger, wherein said dimples have relatively large radius curves between the vertical portion of the dimples and the flat tops, and between the vertical portion of the dimples and the plate into which the dimples are molded, whereby the relatively large radius curves of said dimples are resistant to cracking, and whereby the relatively large flat tops of said dimples in a plate provide support to the adjacent plate in the stack of plates and are unlikely to puncture said adjacent plate, and (b) a plurality of circular indentations or detentes in a plate adapted so that said flat tops of selected dimples in the plate beneath the plate in a stack of plates can nest into said circular indentations or detentes, and wherein said indentations or detentes are formed by a raised donut-shaped area molded into the plates, whereby the plates can be easily aligned with each other when stacked, and whereby the plates will not move with respect to each other.

2. The device of claim 1 further comprising an adhesive positioned in contact with the inside circular portion of a plate surrounded by said raised donut-shaped plate area which forms said indentations or detentes, and in contact with the flat dimple top of an adjacent plate, wherein said adhesive is capable of fusing with, or chemically bonding with, the plastic inside said circular portion of said plate, and the plastic of said dimple top.

* * * * *